United States Patent [19]

Czachowski et al.

[11] Patent Number: 5,774,449
[45] Date of Patent: Jun. 30, 1998

[54] MULTIMEDIA-BASED DECISION SUPPORT SYSTEM FOR HAZARDS RECOGNITION AND ABATEMENT

[75] Inventors: John B. Czachowski, Knoxville, Tenn.; John T. Zoldak, Alexandria, Va.

[73] Assignee: Lockheed Martin Energy Systems, Inc., Oak Ridge, Tenn.

[21] Appl. No.: 415,054

[22] Filed: Mar. 31, 1995

[51] Int. Cl.$^6$ .................................................. G06F 17/40
[52] U.S. Cl. .......................................... 364/506; 364/550
[58] Field of Search .............................. 364/506, 551.01, 364/551.02, 552, 550, 402, 449, 496; 345/172

[56] References Cited

U.S. PATENT DOCUMENTS

| | | | |
|---|---|---|---|
| 3,942,157 | 3/1976 | Azure | 345/172 |
| 4,638,445 | 1/1987 | Mattaboni . | |
| 4,642,782 | 2/1987 | Kemper et al. . | |
| 4,757,463 | 7/1988 | Ballou et al. . | |
| 4,761,746 | 8/1988 | Tano et al. . | |
| 4,974,168 | 11/1990 | Marx | 364/506 |
| 5,105,365 | 4/1992 | McDaniel et al. | 364/496 |
| 5,123,017 | 6/1992 | Simpkins et al. . | |
| 5,195,173 | 3/1993 | Gordon et al. . | |
| 5,206,818 | 4/1993 | Speranza | 364/550 |
| 5,225,996 | 7/1993 | Weber | 364/550 |
| 5,321,629 | 6/1994 | Shirata et al. | 364/551.01 |
| 5,488,558 | 1/1996 | Ohki | 364/449 |
| 5,526,287 | 6/1996 | French | 364/550 |

OTHER PUBLICATIONS

"Artificial Intelligence and Other Innovative Computer Applications in the Nuclear Industry" by M. C. Majumdar et al., Aug. 31, 1987.

*Primary Examiner*—James P. Trammell
*Assistant Examiner*—M. Kemper
*Attorney, Agent, or Firm*—Morgan & Finnegan, L.L.P.

[57] ABSTRACT

A system for monitoring a site includes a portable data collection module used in the field to collect site specific data, and a processor module located at a central location. The data collection module displays choices of categories of findings, and then specific findings within each category. A selected specific finding is then displayed in report form with a citation to the specific code or statutory requirement, as well as a recommended course of action and an abatement date.

11 Claims, 6 Drawing Sheets

Microfiche Appendix Included
(22 Microfiche, 1508 Pages)

FIG. 3

Audit Management System - Satellite: S1

File  New  Browse  Save  Cancel  Reports  Help

ID: S112    DATE: 03/03/94    BLD/RM: 3127    Control Room

PID: S112C    Accountable Per: Scott, C. B.    N:17, E:15

STAT: OPEN    DATE: 03/03/94    RAC: 3    ABATE DATE: 06/01/94

FIND:

CITAT:

RECOMM:

P. EXP.:    # OCCUR:    ABT PLAN    ACT. ABT. DATE:

SURVEYOR: SMITH, J.

Additional Finding Description

FILE  TOP  BOTTOM  HELP

FIG. 5

Audit Management System - Satellite: S1

File　New　Browse　Save　Cancel　Reports　Help

ID [S112]　DATE: [03/03/94]　BLD/RM [3127]　[Control Room]

PID [S112C]　Accountable Per: [Scott, C. B.]　[N: 17, E: 15]

STAT: [OPEN]　DATE: [03/03/94]　RAC [3]　ABATE DATE: [06/01/94] ▽

FIND [Exposed Conductors Accessible to Unqualified Personnel]

CITAT: [S - 1910]　[.303 (g) (2) (i)]

RECOMM: [Provide Physical or Administrative Barrier to Prevent Access]

P. EXP.: [ ]　# OCCUR: [ ]　ABT. PLAN [ ]　ACT. ABT. DATE: [ ]

SURVEYOR: [SMITH, J.]

Additional Finding Description

FILE　TOP　BOTTOM　HELP

FIG. 6

MULTIMEDIA-BASED DECISION SUPPORT SYSTEM FOR HAZARDS RECOGNITION AND ABATEMENT

This invention was made with Government support under contract DE-AC05-84OR21400 to Martin Marietta Energy Systems, Inc. and the Government has certain rights in this invention.

MICROFICHE INDEX

This specification includes a microfiche index containing a software implementation of the invention in machine code. There are twenty-two (22) microfiche containing 1508 frames.

FIELD OF THE INVENTION

The present invention relates to a system and method facilitating the location, description and abatement of hazards. More particularly, the invention relates to a system utilizing at least one satellite data collection module for collecting hazards information and a master module for analyzing the hazards information to identify existing or developing hazards.

BACKGROUND OF THE INVENTION

Industrial site safety is difficult to maintain. This problem multiplies as the size of the site and the number of people working at the site increase. In fact, many industrial sites grow to the point where conventional safety procedures are not able to maintain the site at an optimal safety level.

Currently field inspectors are responsible for identifying possible safety hazards and taking steps necessary to minimize the possible hazards. Specifically, field inspectors move through an industrial site to determine and note existing or developing hazards.

The field inspectors manually complete forms in the field and transfer the hard copies of their reports to a central area for data entry into a rudimentary database management system. In many instances, the collected data includes a unique finding identification number, location/organization of the hazard, the date found, a risk assessment measurement, inspector name, finding description, regulatory citation, and status.

The regulatory citations would be researched for each finding, a description of the finding generated, and a recommendation created. This resulted in long delays in the inspection-to-report cycles and often resulted in inadequate information being transmitted to the customer. Simple, inflexible reports were generated from the inspectors' reports which listed the frequencies of selected hazard types, at best.

The prior reporting system used by field inspectors does not always provide consistent and accurate identification of findings. Additionally, the system provides subjective individualized descriptions of the hazards, rather than consistent descriptions of hazards. Further, the manual nature of the reporting system is not capable of adequately supporting the high flow volume of information from the field to the database management system and from the database management system to the individuals most in need of the information.

As with many manually based reporting systems, the preparation of reports is labor intensive and very slow. This results in a time lag between the occurrence of an inspection and the entry of the inspection data in the database management system. In addition, the quality of the data presented to the database management system is irregular and does not support sophisticated trend analysis and statistics. Finally, the prior system does not provide inspectors in the field with any reference or background data to support their assessments.

In view of the limitations of the prior hazard identification and abatement system, an efficient, reliable and effective system is needed.

SUMMARY OF THE INVENTION

An object of the present invention is to provide an efficient, reliable and effective system and method for the identification and abatement of hazards.

Another object of the present invention is to provide a system and method for quickly and reliably transmitting hazard information from the field to a master module remote from the field.

Still another object of the present invention to provide a system and method for quickly identifying existing and potential hazards to permit expedited abatement of the hazards.

A further object of the present invention is to provide a system and method for quickly and accurately informing responsible individuals when hazards arise, or are likely to arise.

Another object of the present invention is to provide a system and method capable of performing automatic analysis of hazard information to determine trends.

Another object of the present invention is to provide a system and method coordinating textual data, visual data, and mapping information to permit ready access and identification of hazards.

Yet another object of the present invention to provide a system and method which aids inspectors in performing their duties by providing a standardized program through which they can locate and identify hazards.

A further object of the present invention is the provision of a system and method permitting the identification of hazards by standardized explanations that are transmitted from the field to a master module.

These and other objects are achieved by providing a hazard identification and abatement system which includes portable means for collecting site-specific data in digital form, said portable means including a digital camera, means for analyzing the site-specific data, and means for transmitting the site-specific data to the analyzing means.

Other objects, advantages, and salient features of the invention will become apparent from the following detailed description, which taken in with the annexed drawings, discloses the preferred embodiment of the present invention.

BRIEF DESCRIPTION OF THE DRAWINGS

FIGS. 3–6 are computer screens showing creation of a report using the system of the present invention.

DETAILED DESCRIPTION OF THE PREFERRED EMBODIMENT

Figure 1:
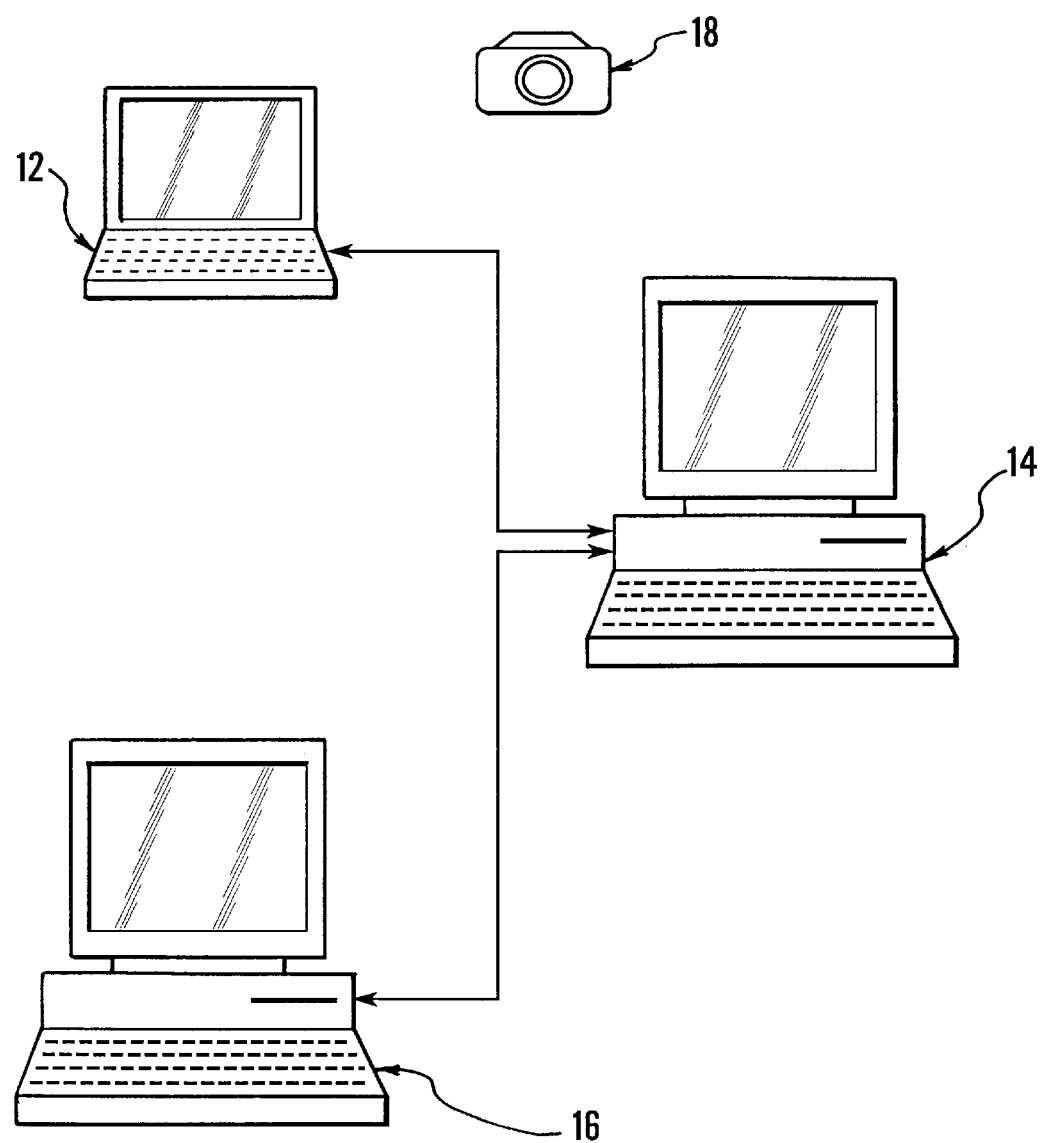
FIG. 1 is a schematic view of a multimedia-based decision support system for hazards recognition and abatement according to the present invention.

With reference to FIG. 1, a system for facilitating the location, description and abatement of hazards is generally referred to by the numeral 10. The system 10 includes a data collection module 12 used in the field by technicians to gather data, and a pre-processor module 14 located in an office remote from the field. Data is transferred between modules 12 and 14 via modem.

The system 10 further includes a master module 16 which is larger than the pre-processor module 14, and is located at a central office. The master module 16 communicates with the pre-processor module 14 via modem and telephone linkage. A digital photographic camera 18 is used in the field by the technician to take photographs of the hazard. These photographs are processed in a form that can be used in the system 10 using an image digitizer and graphics software. The images are then stored in the pre-processor module 14 and can be subsequently downloaded to the module 12 or the master module 16.

The module 12 may be a notebook computer, for example. The module or notebook computer is loaded with software which acts as an inspection management system, by controlling data acquisition and processing.

Briefly, the system 10 utilizes the satellite data collection module 12 and the digital photographic camera 18 to obtain data and photographs, respectively, of the field under study. The data and photographs are transmitted to the pre-processor module 14 where the information is processed for quality control\quality assessment (QC\QA), peer review, mapping integration and photo-linking according to custom software. Finally, the pre-processed information is transmitted to the master module 16 where the information is further processed and archived.

Operation of the System

Notebook computers, pen computers or other electronic recording means (i.e., satellite data collection modules) equipped with sophisticated database software to describe and characterize hazards are provided to field inspectors. The field inspectors are also provided with digital cameras for taking digital photographs. For the sake of definition, the digital cameras are considered to be part of the satellite data collection modules issued to each field inspector.

The inspectors proceed to make their appointed rounds, during which they note the condition of inspection sites with their issued satellite collection data. Description and characterization of hazards includes selecting standardized findings, making risk assessment, locating the specific location of the hazard (to within a fraction of an inch), and digitally photographing the hazard.

The satellite data collection modules 12 preferably comprise a custom database system typically deployed on one or more notebook PCs, for example, IBM-compatible notebook Pcs, and are used by inspectors as they work in the field. Additionally, the digital cameras 18 may be any commercially available camera capable of taking digital photographs.

Each satellite data collection module 12, specifically, each notebook computer, is preloaded with reference data including standardized building/room numbers, inspection findings coupled with regulatory citations and recommendations for abatement, and status codes. As a result, the present system is able to automatically assign unique finding identification numbers that will remain the same for the life of the finding, link hazard locations with facility managers, and calculate scheduled abatement dates according to customer directed priority setting matrix such as the U.S. Department of Energy (DOE) Risk Assessment Code.

The programming associated with the satellite data collection module 12 is designed to minimize the keystrokes necessary to input information, and, therefore, reduce the likelihood of error. The programming is also designed to facilitated standardized findings, while also permitting recordation of findings not found in the program. This is accomplished by providing the inspectors with categorized, multi-level standardized lists of hazards (i.e., findings), for example, under a general broad category such as "electrical hazards" an inspector would choose a specific finding category such as "exposed conductors." This works to cover a multitude of conditions when backed up by a photograph of the specific condition cited. For example, the photograph may show a flexible cord used as a substitute for fixed wiring. The photograph thus serves as a verification for supervisory personnel that the inspector made a correct finding.

When the hazard is selected from a list, a standardized recommendation is stored (e.g., "Install permanent wiring") and reference to a regulatory standard is made (e.g., "OSHA 29 CFR 1910.305(g)(1)(iii)(A)"). This is all done from a multi-level set of reference databases that may have three or more levels or regulatory references deep and is automatically selected with one mouse click or keystroke. This is supported by a unique multi-level hierarchical selector activity, for example, level one could be "OSHA" or "EPA," level two would be "1910-Subpart S," level three "303(g)2 (ii)" and level four "DOE Order 5480.1."

The program will create consistency and increase data collection speed while reducing the chance for keystroke error. Additional procedures accommodate the addition of new findings as well other newly-observed reference information in the memo field (e.g., building numbers/rooms) that were not previously loaded from existing real property and maintenance records. In this way, satellite modules are also able to record changes in the field including buildings, re-assigned facility managers, etc.

The program associated with the transmission of satellite data to the pre-processor or master collection module is accessed by pressing a button within the module, eliminating the need to exit. A custom script automatically calls the appropriate number and executes data transfer programs without the need for the user to do anything more. However, other software communication packages could be used without departing from the spirit of the present invention.

As stated previously, the satellite data collection module permits the recordation of milestones related to the abatement of hazards and the estimated costs of these activities and their status. The satellite data collection module also permits discrimination between newly entered/modified inspection records. The system stamps each transaction on findings in the database with the data entry date and badge number of person modifying the data, and establishing a chain of custody using the satellite record "stamp" as well as the validation stamp occurring on the pre-processor.

The satellite data collection module permits automatic assignment of unique finding identification numbers that remain with the finding from "cradle to grave" to allow the tracking of each finding from the date it is created until the hazard has been eliminated and evidence of closure gathered with a photograph. Photographs are introduced into the system as a means of eliminating or reducing the need for lengthy descriptions of the specific hazard. They are also used to demonstrate closure of the finding. This is done by assigning a unique computer-specific ID prefix for each satellite computer. The assignment program automatically assigns the next sequential number with each new finding. The number is configured so that photographic files have the same ID number as the finding with the addition of a through z and 0–9. Thus, an ID for any finding can have up to 36 pictures which is well in excess of current requirements. Photographs assist decision makers to visualize the nature of the finding which helps in setting appropriate priorities. Photos are also used to prove closure of findings to management and outside regulatory agencies (OSHA, EPA, etc.).

The satellite data collection module permits information obtained by the field inspectors to be linked with one or more digital photographs of the inspector's findings.

The satellite data collection modules assist less experienced inspectors by providing them with reference lists tailored to specific inspection activities. By following a standard entry procedure, continuity and consistency of information available for each hazard is achieved. Additionally, repetitive data is carried from record to record, thus, reducing entry labor. The satellites can also log unlimited milestones related to the further characterization and abatement of hazards, including costs, interim actions, interim action dates, and responsible individuals.

Use of the satellite modules supports consistent and accurate hazard recognition in the field, thereby, eliminating the need for entry of hand written data in the office. The satellite data collection modules also support two-way communication between the field and the main office via the transfer of field data and the downloading of reference data or records for follow-up inspection using conventional phone lines.

Ultimately, the information input into the satellite data collection module is processed and electronically transferred via standard telephone lines to the pre-processor information management system.

The pre-processor information management system module is typically a desk top PC (e.g., IBM-compatible desktop PC) located at a central office. The pre-processor is loaded with database management software, commercially available mapping (such as Map Info, Intergraph and Auto CAD, or any other program that allows combining data and map images) and image processing software, a photodigitizer unit, and mass storage devices. The pre-processor module also includes a modem for receiving and transmitting information.

The pre-processor module functions to collect data from the satellite data collection modules, conduct peer review and QA/QC, provide program managers with early warnings of severe findings, couple data and photographs with engineering drawings and/or area maps, and transfer "clean" data to the master module.

In addition to data management, the pre-processor module utilizes the aforementioned commercial mapping package (e.g., MapInfo) and digital photographic tools. The photographs are created on a digital camera in a format that allows the picture to be displayed inside a database and mapping program. The photograph can be managed in the system as a database element and displayed upon command.

The map program allows an icon to be created that is linked to the finding ID number and picture ID number. This allows the pre-processor to locate an icon on the map in the corresponding spot where the finding is located. This map, icon, database and photo connection allows managers to see at a single glance their entire facility and see hotspots were problems exist. The manager can see specific information and a photo of each separate finding. This aids in decision making and priority setting.

The pre-processor is also tasked to maintain and distribute reference data, including, building, facility manager, finding category, recommendation, and regulatory citation files.

The pre-processor information management system module functions in the following manner. Data is received from the field (via the satellite data collection modules) and is reviewed for QC\QA by a qualified senior professional for completeness, accuracy and consistency. Questionable data is re-routed to the field inspector for updating/clarification, or it is removed from the system (only under predetermined circumstance in accordance with the objects of the system). Serious findings are immediately recognized and acted upon, while other findings are routed through the system.

Notification reports may be sent to those individuals with responsibility for abating the hazards. All three modules (satellite, pre-processor and master) can produce reports. The pre-processor module can produce more comprehensive reports than the satellite and the master can produce the more comprehensive reports for periodic management reporting. This allows the inspector to leave a preliminary report while still in the facility and the other two modules provide verified and comprehensive reports and graphics.

The reports summarize inspection findings, recommend abatement strategies, and even contain a printed picture of the findings. Preliminary reports without pictures can be generated in the field by the satellite data collection modules. Final reports containing QA/QC'd data can be sent by fax, plant mail, or delivered to the building manager. Other reports may indicate inspection progress, support trend analysis, and brief management.

The pre-processor mapping system links inspection data with engineering drawings, aerial site photographs and digital photographs of findings. As a result, engineering drawings are displayed with superimposed icons for each inspection finding. When an icon is activated with a mouse click, summary data is collected from the finding database and together with photographs are displayed on the screen. Additionally, queries by date, location, type, etc. can be written for more sophisticated graphical analyses and demonstrations.

Finally, the information processed by the pre-processor information management system module is transferred to the master module. The master module is preferably a high powered desktop PC (e.g., IBM-compatible desktop PC) located at a central location. As with the pre-processor, the master module includes custom database management software permitting the support of a complete database and archiving of the data. The custom database management software also provides a platform for automated analysis, including, trend analysis, status, grouping hazards by severity, classification, and location, routine progress reports, etc.

The present system is specifically appropriate were consistent data collection and classification is required in a remote location, data from one or more stations is transferred to a central pre-processing station for QC\QA and peer review, photographs will assist in documentation and decision support, inspection data must be linked to a geographic point with precision, and sophisticated analyses of the data is supported via the database management system and mapping system (i.e., graphically showing the location of specific kinds of findings).

With this in mind, the present system can be used in performing facility management. That is, developing a baseline assessment of facilities, documenting conditions, work place activities and then supporting routine inspections to document the need for facility upgrade, maintenance, and suitability for assorted uses.

System Flow Chart

Figure 2:
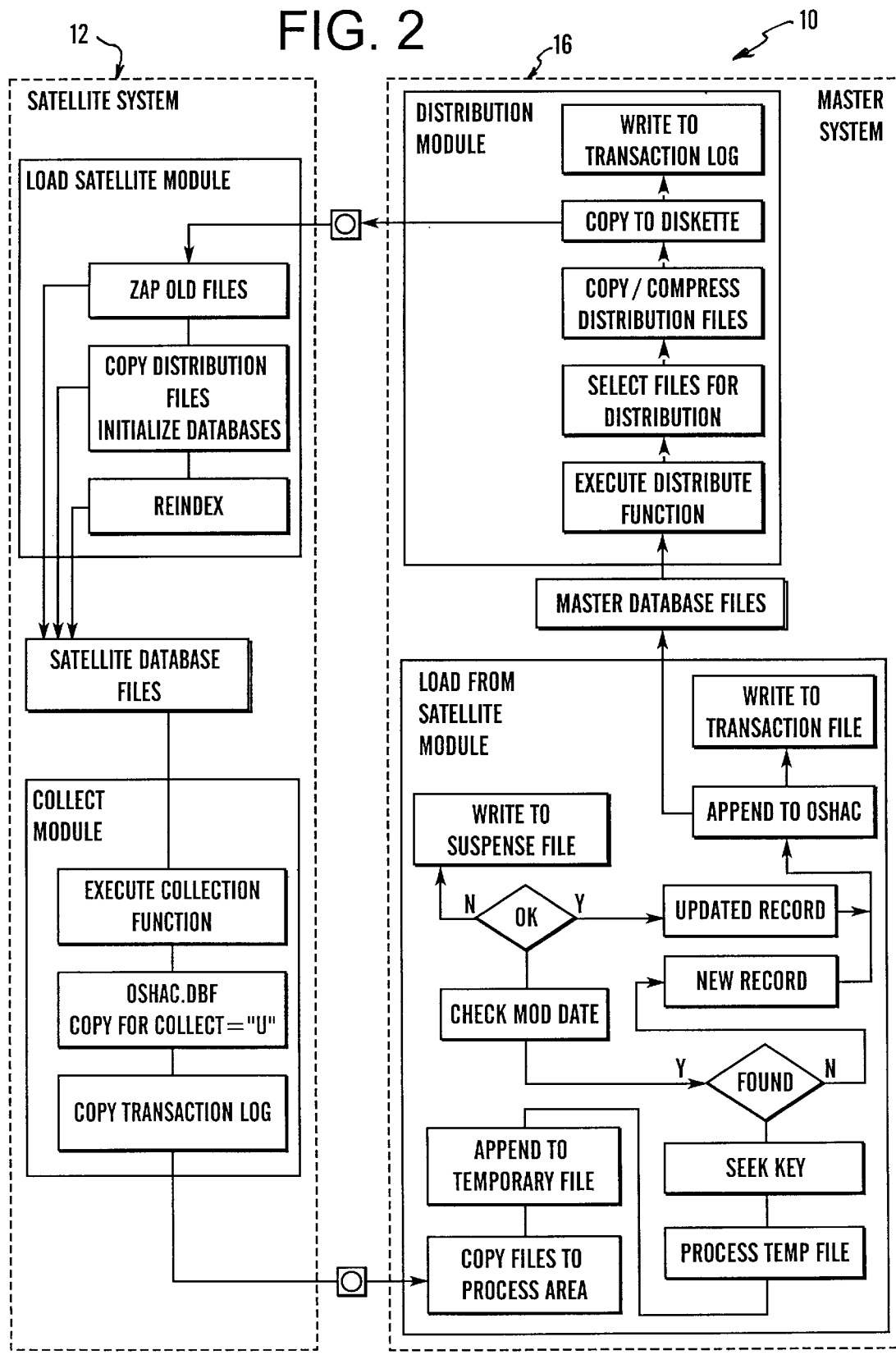
FIG. 2 is a schematic block diagram of the multimedia-based decision support system of FIG. 1, showing details of the satellite and master modules.

FIG. 2 is a combined schematic, system flow chart showing the interplay between the satellite module 12 and the master system 16. It should be understood that, as depicted in FIG. 2, the satellite module 12 can communicate directly with the master module 16, or through a preprocessor module 14 (FIG. 1), which would essentially include the same flow chart as the master module.

Before the technician initiates an inspection, reference data or records pertinent to the site being inspected are downloaded to the satellite module 12 from the master module 16. This is initiated in a software routine referred to as the distribute module in FIG. 2, and including the following steps:

(1) Execute Distribute Function (2) Select Files For Distribution (3) Copy/Compress Distribution Files (4) Copy to Diskette (5) Write To Transaction Log As seen in FIG. 2, the diskette is then transferred to the satellite module 12 for downloading, which is initiated by a software routine referred to as the load satellite module. This routine sets up satellite database files following execution of the following steps:

(1) Zap Old Files (2) Copy Distribution Files and Initialize Databases (3) Reindex The technician can then begin collecting data. Data collection is facilitated with software referred to as the collect module, and including the following steps:

(1) Execute Collection Function (2) OSHACDBF Copy for Collect="U"

(3) Copy To Transaction Log

Step (2) refers to a specific application where the inspection is an OSHA inspection, where CDBF stands for "collect data base file." This represents a completed record which includes at least one finding.

The collected files can then be downloaded from the satellite module 12 to the master module 16. This loading function is managed by software in the master module 16 referred to as the "load from satellite module." This software runs through the following steps:

(1) Copy Files To Process Area (2) Append To Temporary File (3) Process Temporary File (4) Seek Key (5) Decision - If not found, begin new record; if found check modification date; if modified, create updated record, if not modified, write to suspense file (6) Append (either updated or new) Record To OSHAC (7) Send To Master Database Files In FIG. 2, transfer of records between the satellite and master is described using diskettes, although this is more likely to be done through modem transmission via telephone.

Computer Screens

When the surveyor begins his survey, he turns on the notebook computer that corresponds to the satellite module, and a screen such as that shown in FIG. 3 appears.

The screen identifies which satellite module is in use; in the illustrated case, the module is "S1." The surveyor initiates the program by moving the arrow with a mouse to click the word "new" appearing near the top of the screen or by keystroking "ALT N". After this is done, the program automatically enters the present date, and advances to the first level of manual data entry.

The first level entails entering data about the location of the survey. The screen will display a hierarchical choice, first giving the surveyor the option to choose the building number within a plant or facility. On the first choice, the surveyor uses the mouse to choose a building number from those displayed on the screen or by "soft key" search by keying in the number desired.

After selecting a building number, the screen then displays a list of possible room numbers, and the appropriate room is selected. Again, the soft seek function could be used to enter the room number. Next, the picture I.D. number will be highlighted. This allows the surveyer to add a picture, and a picture I.D. number is generated. Next, the screen will display an option for entering the location within a room, as measured in feet from the north wall, and feet from the east wall. These measurements provide a coordinate-based measurement of the precise location of a finding. The measurements can be made by the surveyor using an electronic distance measurement tool, or other suitable means.

Next, the surveyor chooses the status, with the screen providing three possible choices: "no finding," for situations where no hazards were found and thus there will be no finding; "open," for situations where a hazard was found and a finding report will be generated; and "closed," where a finding was found and fixed while the surveyor was still on the site, or where the surveyor was re-inspecting a prior finding to determine compliance or abatement.

The computer program automatically generates a unique finding number, appearing on the computer screen of FIG. 3 as the ID number ("S112"), as soon as the building and room are selected. This appears on the same line as the current date ("03/03/95"), and the building ("3127") and room number ("control room"). The measured distance from the north and east walls (N:17, E:15) is displayed on the second line under the building and room number. A date of finding ("03/03/95") is also generated automatically and displayed next to the selected status ("Open") on the third line.

Figure 4:
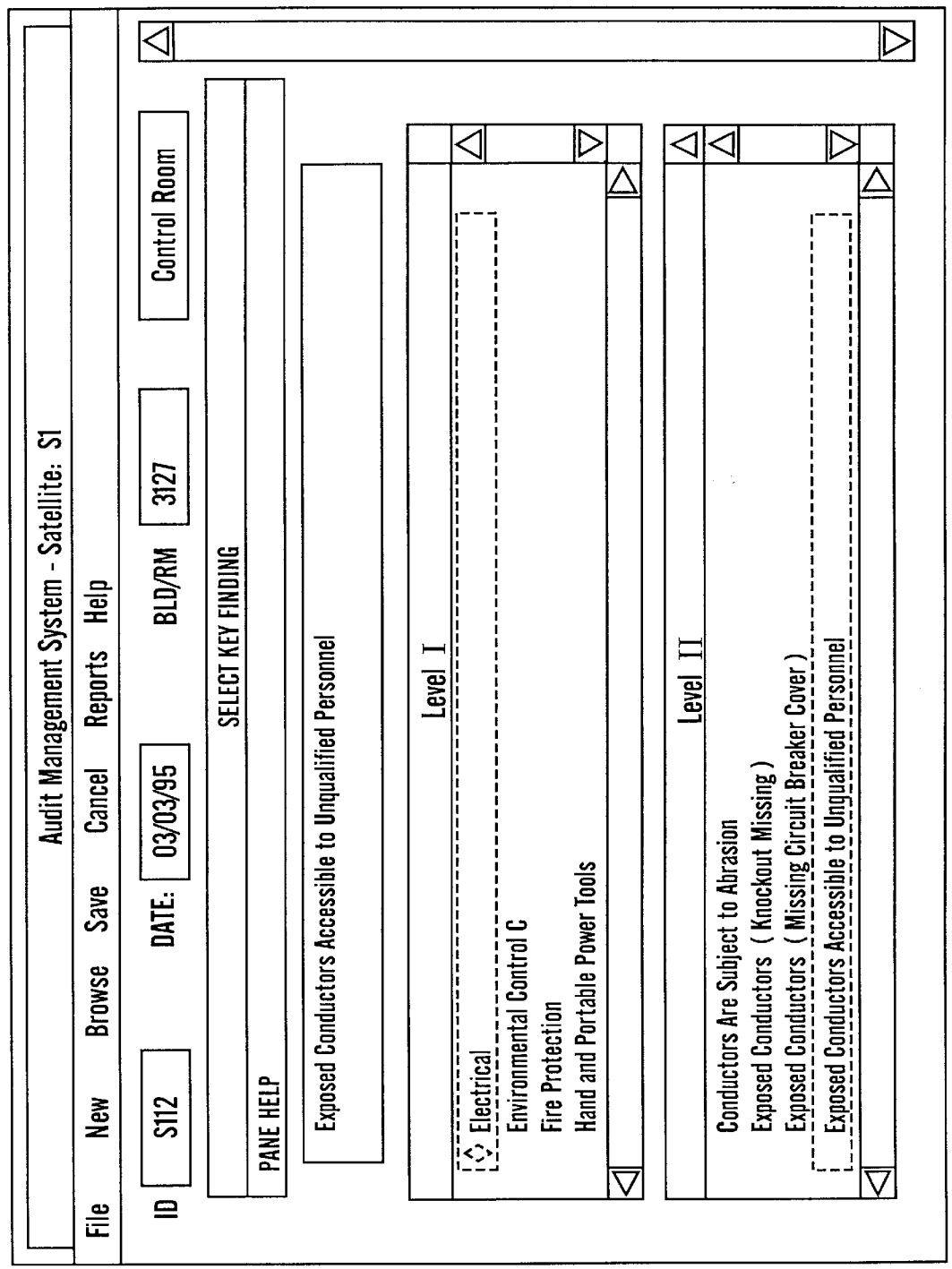

Upon choosing the "open" status, the program automatically displays a hierarchical list of findings, beginning first with very broad categories, such as those shown in FIG. 4 in the "Level I" box. These include the following: "electrical," "environmental control," "fire protection," and "hand and portable power tools."

If the finding involves an electrical problem, the surveyor clicks on the electrical category, which causes the screen to display Level II options, which include more detailed descriptions of the finding. These may number around 100, and the surveyor can scroll through the list until arriving at the most suitable description. In the illustrated embodiment, this list in the Level II box includes a description for "exposed conductors accessible to unqualified personnel." The surveyor uses the mouse to click on this selection, and the selected finding then appears in the upper report box.

Once the finding is entered, a screen with complete information appears, as shown in FIG. 5, which displays the finding, the code citation ("S-1910 .303(g)(2)(i)") which the finding violates, and the recommended course of action ("Provide physical or administrative barrier to prevent access").

Next, the surveyor must assign a risk assessment code (RAC) number, indicating the severity of the finding. This is a number from 1 to 5, chosen on the basis of a matrix having seriousness (death, loss of limb, etc.) and potential (immediate, less immediate, etc.). In the illustrated embodiment, as shown in FIG. 5, the surveyor key-stroked in the number "3," which the program automatically assesses an abatement date within 90 days, or by "06/03/94."

Any findings that are not listed as options for selection by the surveyor can be written in by use of the memo box, headed by the text "additional finding description."

After saving, the surveyor takes a digital photograph with the digital camera, and takes the "floptical" disk back for processing. The processed images are then entered into the database at the pre-processor module, or the master module, and correlated to the specific finding number. A "white board" notation can be made with the finding number to ensure proper correlation.

Figure 6:
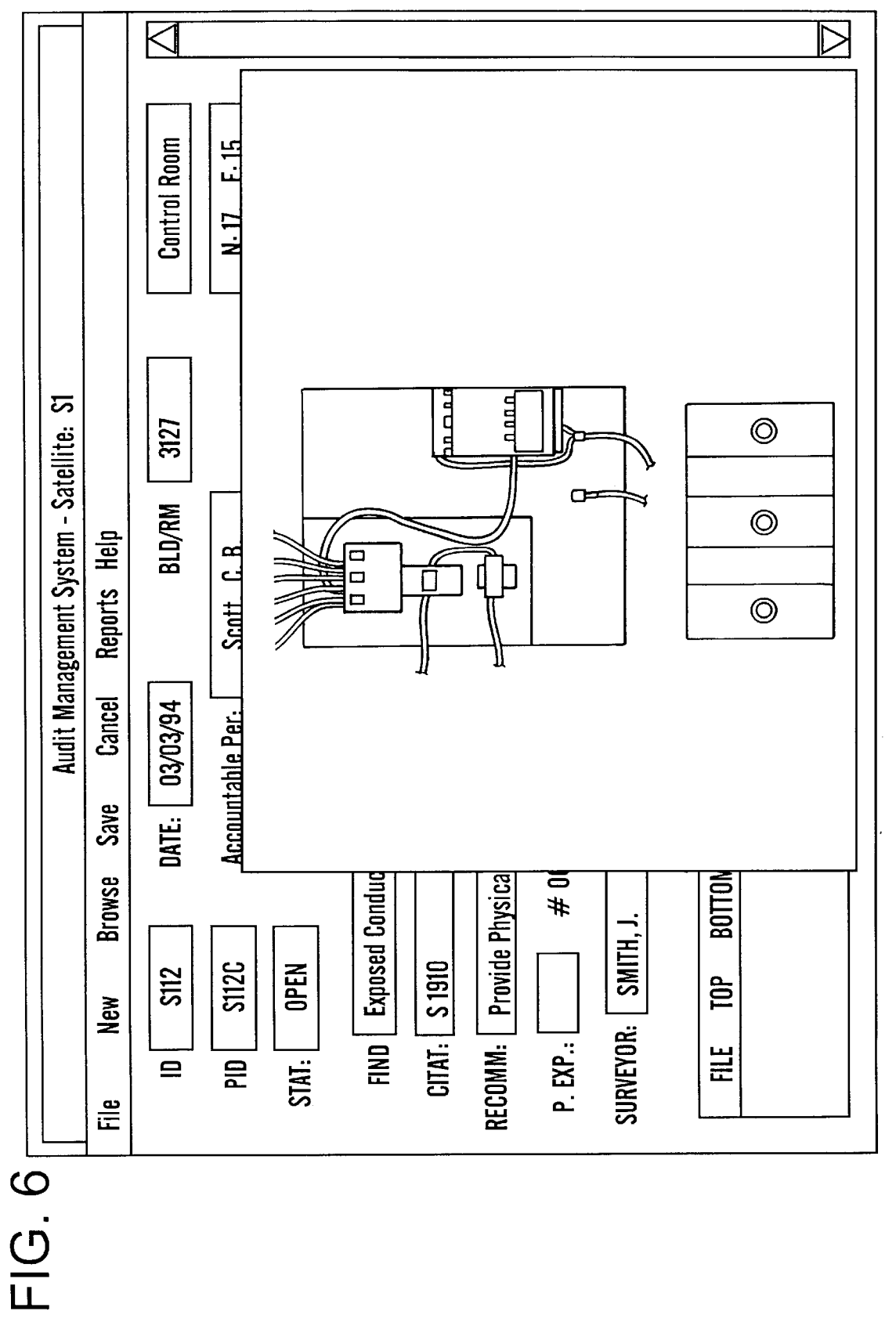

The photograph can be superimposed on the screen, as shown in FIG. 6, so that the supervisor at the office can verify the surveyor's findings. Moreover, the photograph can be downloaded from the pre-processor to the notebook so that the surveyor can observe the original finding when verifying completion of abatement.

The present system may be used for any number of different kinds of inspections, such as disaster assessment. The field inspectors could assess the location and degree of destruction by entering data and making digital photographs at ground level or aerial. The data could then be transmitted to a central location for analysis and decision support. Subsequently, inspections can be performed to verify progress on recovery and to validate that resource level meets actual requirements.

Further, the system can be used for environmental assessment and remediation. As such, data from field inspection and analytical data (e.g., from direct-reading instruments) can be linked to photographs to display the location of hazardous substances. This data can be used to formulate remediation plans and to follow progress.

The system can be used to collect data from many locations by multiple data collectors and still provide objective, consistent and reproducible data. By controlling variability of information gathered through the use of methods that use hierarchical choices in the form of pick lists versus subjective descriptions the system provides very broad to specific selections to describe an event or condition. The system also allows for recording unique information not previously encountered and provides a means to disseminate the information to all data collectors simultaneously. The inspector is free then to provide highly specific information by the use of location co-ordinates, photographs and memo functions. This eliminates the need for length descriptions and yet allows a high degree of specificity.

The process can be applied in any field in which there is a need to compare conditions against a standard such as regulations or historical norms. The system can provide decision makers objective, consistent, reproducible results. The system provides rapid collection, analysis, management and reporting of data. Moreover, the system provides data in real time and by using maps and photographs provides data in a format that is easily understood and interpreted by decision makers far removed from the scene.

To facilitate an understanding of the invention, an example of a computer program, in machine code, is appended to the specification as a microfiche appendix. The source code, from which the machine code was compiled, was written in the "Clipper" language, version 5.2. This high level database language uses the same database file formats as dBASE IV and Foxpro. The program was written for an IBM or IBM-compatible machine.

While the preferred embodiment of the present invention has been shown and described, it will be understood that it is intended to cover all modifications and alternate methods falling within the spirit and scope of the invention as defined in the appended claims or their equivalents.

What is claimed is:

1. A system for monitoring a site and reporting at least one finding specific to the site, comprising:
   at least one portable data collection module including means for inputting site-specific findings data;
   memory means for storing optional categories of findings and a plurality of optional specific findings under each general category, including means for storing code reference data corresponding to each specific finding;
   means for displaying the optional categories and specific findings, and means for entering categories and specific findings chosen from those displayed including means for displaying the code reference data corresponding to each entered specific finding; and
   means for generating a report for each finding based on the site-specific findings data.

2. A system according to claim 1, wherein the memory means includes means for storing recommended course of action data corresponding to each specific finding, and means for displaying the recommended course of action data corresponding to each entered specific finding.

3. A system according to claim 1, wherein the memory means includes means for storing abatement date data corresponding to each specific finding, and means for displaying the abatement date data corresponding to each entered specific finding.

4. A system according to claim 1, further comprising a processor module disposed in a central location and having means for selectively receiving the site-specific findings data from the portable data collection module.

5. A system according to claim 4, further comprising camera means for generating photographic data corresponding to each finding, and wherein the processor module includes means for inputting the photographic data corresponding to each finding, and means for displaying the findings data and photographic data for each finding.

6. A system for monitoring a site and reporting at least one finding specific to the site, comprising:
   at least one portable data collection module including means for inputting site-specific findings data,
   memory means for storing a list of buildings located at each monitored site and a list of rooms corresponding to each building on the list,
   display means for displaying, at first, the list of buildings and then the list of rooms corresponding to a selected one of the buildings,
   means for inputting, at first, a selection from the list of buildings and then a selection from the list of rooms;
   means for generating a report for each finding based on the site-specific findings data;
   means for quantifying the location of each finding within a selected building and room including an electronic measuring device; and
   means for entering into the at least one portable data collection module location data corresponding to the location of each finding within each room.

7. A method for monitoring a site and reporting at least one finding specific to the site, comprising the steps of:
   inputting site-specific findings data with at least one portable data collection module
   generating a report for each finding based on the site-specific findings data;

storing in memory means optional categories of findings, a plurality of optional specific findings under each general category, and code reference data corresponding to each specific finding;

displaying the optional categories, the specific findings, and the code reference data corresponding to each entered specific finding; and entering categories and specific findings chosen from those displayed.

8. A method according to claim 7, wherein the step of storing in memory means includes storing recommended course of action data corresponding to each specific finding, and displaying the recommended course of action data corresponding to each entered specific finding.

9. A method according to claim 7, wherein the step of storing in memory means includes storing abatement date data corresponding to each specific finding, and displaying the abatement date data corresponding to each entered specific finding.

10. A method according to claim 7, further comprising the steps of:

selectively downloading the site-specific data collected in the field with the portable data collection module to a processor module disposed in a central location;

generating photographic data corresponding to each finding with camera means;

inputting the photographic data corresponding to each finding into the processor means; and displaying the findings data and photographic data for each finding.

11. A method for monitoring a site and reporting at least one finding specific to the site, comprising the steps of:

inputting site-specific findings data with at least one portable data collection module including memory means;

storing in memory means a list of buildings located at each monitored site and a list of rooms corresponding to each building on the list;

displaying, at first, the list of buildings and then the list of rooms corresponding to a selected one of the buildings with display means;

inputting, at first, a selection from the list of buildings and then a selection from the list of rooms; and generating a report for each finding based on the site-specific findings data, quantifying the location of each finding within a selected building and room with quantifying means, including quantifying the location of each finding with an electronic measuring device, and entering into the at least one portable data collection module location data corresponding to the location of each finding within each room.

* * * * *